INVENTOR:
ERIC WILLIAM PENDLE HARRIS

By MASON, KOLEHMAINEN, RATHBURN & WYSS
ATTORNEYS

United States Patent Office 3,462,220
Patented Aug. 19, 1969

3,462,220
PHOTOGRAPHIC COPYING APPARATUS
Eric W. P. Harris, Cumnor Hill, England, assignor, by mesne assignments, to A. C. Nielsen Company, Chicago, Ill.
Filed Oct. 13, 1966, Ser. No. 586,449
Int. Cl. G03b 27/32
U.S. Cl. 355—64                    10 Claims

ABSTRACT OF THE DISCLOSURE

Apparatus for feeding material to a work position comprising a conveyor having drive means for advancing the same and control means for coordinating the conveyor advancement with the performance of a work operation on the material carried by the conveyor. The control means includes sensing means for sensing the advance of the conveyor, arresting means controlled by the sensing means for stopping the conveyor, initiating means controlled by the sensing means for starting the performance of a work operation and restarting means for starting advancement of the conveyor after completion of a work operation.

---

The present invention relates to apparatus which is particularly although not exclusively suitable for use in the preparation of micro-film photographs and relates more particularly to apparatus for feeding material to be photographed to a work position in front of a camera and co-ordinating the rate of feed of the material with the operation of the camera.

The apparatus of the invention is particularly suitable for use in preparing micro-film photographs of data records which are delivered on a continuous strip or on separate sheets by a computer, but it is capable of other applications such as feeding a succession of work-pieces through a work position in which a work operation is performed on each successive work-piece, the rate of feed of the work-pieces being coordinated with the rate at which the work is completed on each piece.

Hitherto, the usual procedure for micro-filming documents has been to place each document in position beneath a micro-film camera by hand and then to operate the camera by a hand or foot control to photograph the document, after which the document is removed by hand and the next document placed in position for photographing. This is subject to certain limitations particularly in the rate at which a succession of documents can be photographed.

It is an object of this invention to provide apparatus whereby a plurality of documents can be successively fed to a work position and photographed individually.

It is a further object of the invention to provide apparatus whereby data which is fed on either continuous strip or on separate sheets can be recorded automatically by a succession of micro-film photographs.

According to the present invention there is provided apparatus for feeding material to a work position comprising a conveyor for advancing material to a work position, drive means for advancing the conveyor, control means for arresting the advance of the conveyor and initiating performance of a work operation, and means for restoring advance of the conveyor when the work operation has been performed, the control means being arranged to arrest the advance of the conveyor after it has advanced through a predetermined distance.

According to a further form of the invention there is provided means for automatically feeding a section of material to be photographed to a copying position in front of a camera and for automatically causing the camera to photograph the material, and then advancing a fresh section of material to the copying position to be photographed.

Figure 1:
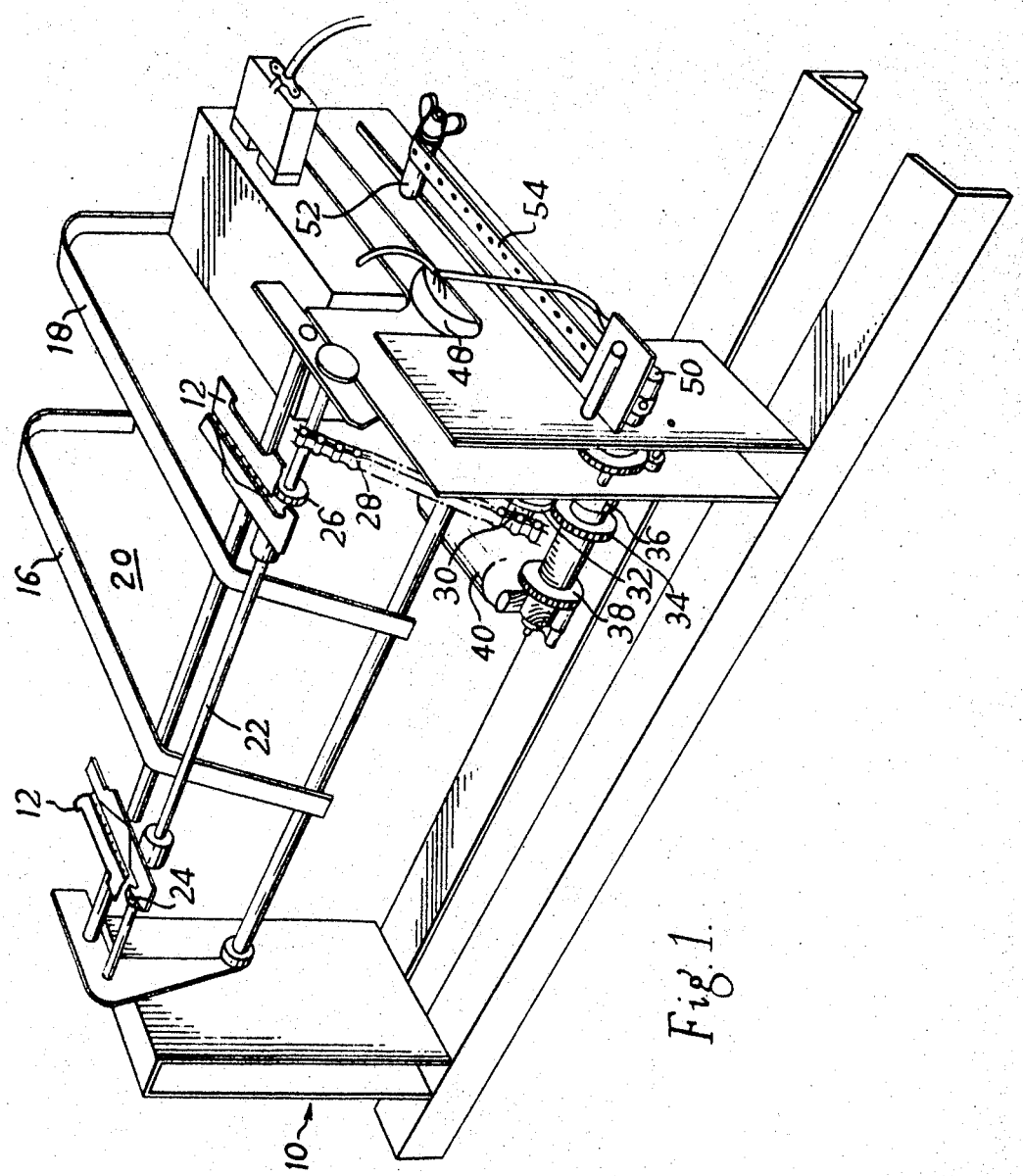
Figure 2:
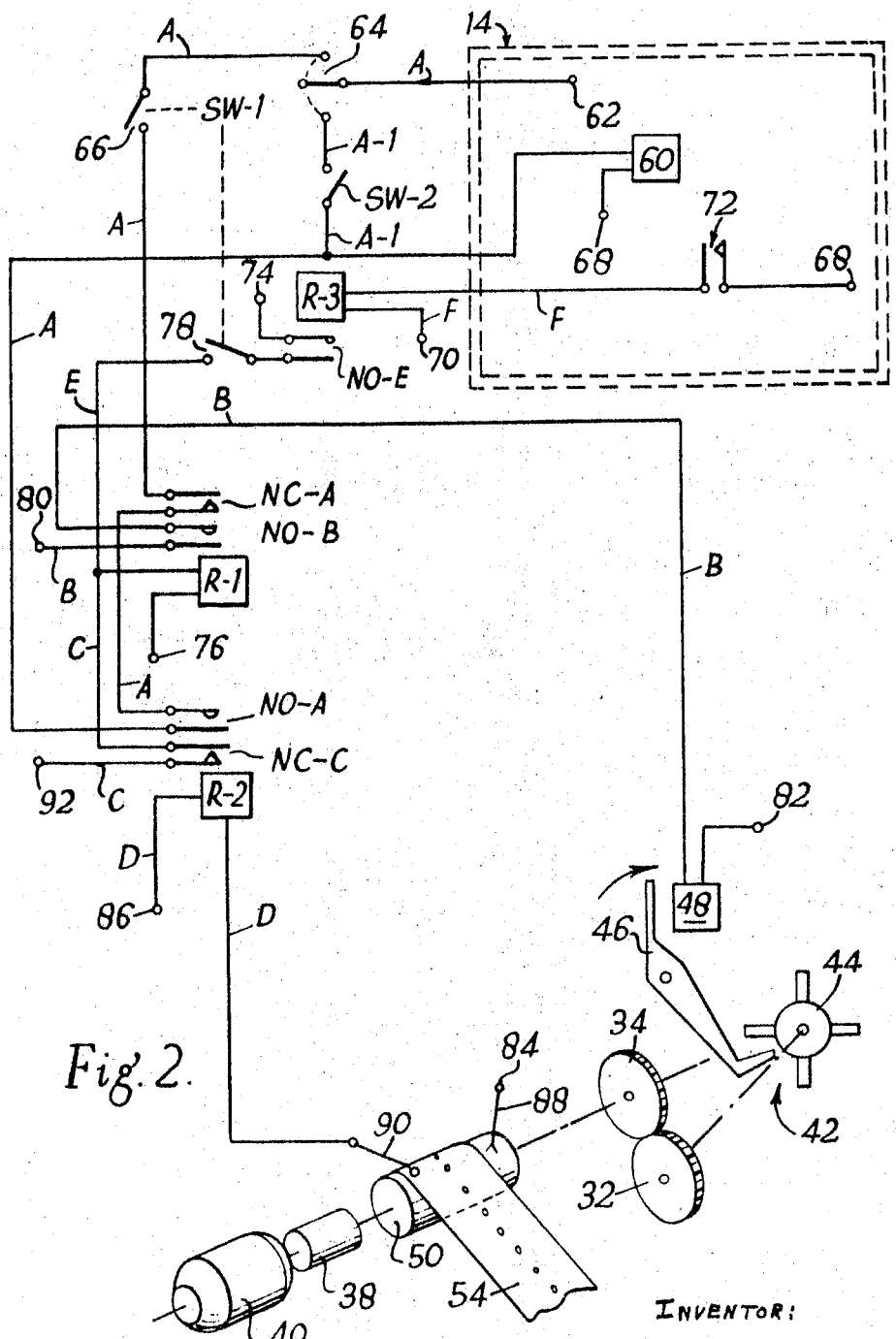

A preferred form of the apparatus which exemplifies the invention will now be described with reference to the accompanying drawings in which:

FIGURE 1 is a schematic perspective view of a transport mechanism forming part of the invention; and FIGURE 2 is a schematic representation of control means forming part of a preferred form of the invention.

Referring to FIGURE 1, the transport mechanism is adapted to feed a continuous strip of individual sheets of paper and comprises a frame indicated generally at 10, an endless belt conveyor 12 which is arranged so that its upper flight passes through a work position indicated generally at 20 above which is located a micro-film camera 14 indicated schematically in FIGURE 2. Guides 16 and 18 extend laterally of the conveyor for guiding material through the work position. A rotatable main shaft 22 has fixed sprockets 24 and 26 which engage the conveyor in driving relation. The main shaft 22 is connected by a chain drive 28 to a lay shaft 30 which in turn is connected by reduction gears 32 and 34 to a driving shaft 36. The driving shaft 36 is connected through a torque clutch 38 to an electric motor 40 from which drive is transmitted to the conveyor. The reduction gears 32 and 34 effect a reduction of about 1:6 from the drive shaft to the lay shaft.

A dog clutch 42, shown schematically in FIGURE 2, comprises a dog-wheel 44 which is fixedly mounted on the lay shaft 30, and a spring loaded pawl 46 normally engages the dog-wheel to prevent rotation thereof. An electro-magnet 48 is positioned so that, when energised it causes the pawl 46 to disengage from the dog wheel 44. Engagement of the pawl with the dog wheel prevents rotation of the shafts 22, 30 and 36 when the motor is running and the drive of the motor is then taken up by the torque clutch 38. Energisation of the magnet 48 disengages the pawl from the dog wheel and permits the shaft to rotate.

An electrically conductive contact roller 50 is fixedly mounted on the driving shaft 36 and an idler roller 52 is mounted for rotation parallel with the contact roller and is adjustable so that the distance between the idler roller and the contact roller can be varied.

A perforated endless belt 54 of paper or other electrically insulating material extends round the contact roller and the idler roller and is driven by rotation of the contact roller with the driving shaft 36.

The contact roller and paper belt form part of a system for controlling the apparatus, which system will now be described.

The control system includes electrical circuits which contain a camera start relay 60 and relays R–1, R–2, and R–3. Each of the relays includes one or more pairs of electrical contacts which are either normally open or normally closed, energisation of the relays opening or closing the contacts according to their former condition as will be described.

The camera start relay 60 may be located in the camera and is energised through a circuit A. When energised, the relay 60 causes the camera to perform a cycle of operations comprising exposing and winding on the film. The circuit A includes a terminal 62 which is connected to a source of voltage, and a two-way "auto-manual" switch 64, a pair of terminals 66 included in an on/off switch SW-1, a pair of normally closed contacts NC-A controlled by the relay R-1 and a pair of normally open contacts NO-A controlled by the relay R-2. In a first of its positions the auto manual switch 64 is capable of completing the circuit A and in the second of its positions it completes the circuit A through a conductor A-1 by-passing the switch 66 and the contacts NC-A and NO-A. The by-passing conductor A-1 includes an on/off switch SW-2 which permits manual or foot control of the apparatus.

A circuit F extends between terminals 68 and 70 and includes a pair of normally open end-of-cycle contacts 72 which are located in the camera and which are momentarily closed by the mechanism of the camera after an exposure of the film has been made and the film wound on. Also included in the circuit F is the winding of the relay R-3 which becomes energised during the momentary closure of the end-of-cycle contacts 72.

The relay R-3 has a pair of normally open contacts NO-E which are included in a circuit E extending between terminals 74 and 76 which are connected to a source of voltage. The circuit E extends from the terminal 74, through the contacts NO-E, through a pair of contacts 78 which are also controlled by the on/off switch SW-1, through the winding of the relay R-1 to the terminal 76. Thus, when the contacts 78 are closed, energisation of the relay R-3 causes its normally open contacts NO-E to close thus completing the circuit E and energising the relay R-1.

The relay R-1 controls the previously mentioned normally closed contacts NC-A in circuit A and it also has a pair of normally open contacts NO-B which are included in a circuit B.

Circuit B has terminals 80 and 82 which are connected to a source of voltage and extends from the terminal 80, through the contacts NO-B of relay R-1, through the winding of the magnet 48 to the terminal 82. Thus, when the circuit B is closed the magnet 48 is energised and disengages the pawl 46 from the dog wheel 44 to permit the drive from the motor 40 to be transmitted to the main shaft 22 thereby advancing the conveyor and the insulating belt 54. Energisation of the relay R-1 therefore causes the conveyor to advance data records or other material on the conveyor through the work position and also breaks the circuit A so that the camera is rendered inoperative while the conveyor is moving.

The contact roller 50 forms part of a circuit D which extends between terminals 84 and 86 which are connected to a source of voltage. The circuit D extends from the terminal 84 to a common brush 88 which is permanently in electrical contact with the contact roller 50, through the roller 50 to a reading brush 90 which has the form of a resilient contact engaging the contact roller 50 through a perforation in the insulating paper belt, through the winding of the relay R-2 to the terminal 86. As the paper insulating belt is advanced imperforate portions of it come between the reading brush and the contact roller 50 interrupting electrical contact between them until a further perforation in the belt permits the reading brush to resume contact with the roller 50 whereupon circuit D is again completed and the relay R-2 is energised.

The relay R-2 controls a pair of normally closed contacts NC-C in a circuit C in addition to the normally open contacts NO-A in circuit A. The circuit C extends from a terminal 92 through the contacts NC-C to the winding of the relay R-1 and then to the terminal 76, and when completed energises the relay R-1. Thus, although the relay R-1 is only momentarily energised through the circuit E by momentary closure of the end-of-cycle contacts 72 at the end of a cycle of operation of the camera, relay R-1 remains energised through the circuit C which is closed by deenergisation of the relay R-2 immediately the insulating belt advances breaking contact between the reading brush 90 and the contact roller 50. As the insulating belt continues to advance another perforation moves forward and eventually the reading brush is again able to make contact with the contact roller so as to energise relay R-2. When the relay R-2 is energised it closes the normally open contacts NO-A and at the same time opens the contacts NC-C and thus deenergises the relay R-1 causing the contacts NO-B to be opened. Opening of the circuit B deenergises the winding of the magnet 48 in consequence of which the pawl 46 engages the dog-wheel 44 thus stopping rotation of the shafts 22, 30 and 36 and arresting the conveyor. The timing of the dog clutch is such that the insulating belt is stopped while a perforation permits the reading brush to contact the roller 50 so that the circuit D is complete.

The micro-film camera will normally complete a cycle of operation involving exposure and winding-on of the film in a fixed period which may be about 1.5 seconds from the time of energising the camera start relay 60.

The on/off switch SW-1 constitutes a main control switch and gives overall control of the operation of the apparatus by simultaneously opening or closing the pairs of contacts 66 and 78 in circuits A and E respectively.

In order to use the apparatus for automatic operation in taking a series of photographs of each of a succession of records, the sequence of procedure and operation for photographing documents on the conveyor is as follows, assuming that potential is available to all the circuits and the perforated belt 54 is positioned so that the reading brush 90 makes contact with the contact roller 50 through a perforation in the belt and that the circuit A is broken at the contacts 66 by the main control switch SW-1.

The auto-manual switch 64, is moved to its front, or "auto," position thus disconnecting bypass conductor A-1 from a circuit A. The relay R-2 is therefore energised via the circuit D and the relay R-1 is deenergised so that the dog clutch is engaged and prevents movement of the conveyor.

The main control switch SW-1 is now operated to close the contacts 66 and 78. Circuit A is thus completed and the camera start relay 60 is energised. The camera therefore performs a single cycle of operation, photographing a document positoned on the conveyor and advancing the film and momentarily closes the end-of-cycle contact 72. This completes the circuit F so that the relay R-3 is operated and relay R-1 becomes energised via the circuit E thus opening the circuit A and closing the circuit B. The camera is therefore made inoperative and the dog clutch disengages so that the conveyor and insulating belt advance. Movement of the insulating belt from its original position breaks contact between the reading brush and the contact roller and the relay R-2 is therefore deenergised and the relay R-1 is held energised through the circuit C.

Eventually the next perforation in the advancing paper belt comes between the reading brush and the contact roller restoring contact between them and the relay R-2 becomes energised, opening the circuit C and deenergises the relay R-1. The winding of the magnet in circuit B therefore becomes deenergised and the dog clutch stops the conveyor and insulating belt.

The timing of the dog clutch is such that the insulating belt comes to rest with one of its perforations so positioned that the reading brush contacts the contact roller so that the relay R-2 is held energised.

Immediately the relay R-2 becomes energised it closes the circuit A and the camera start relay 60 is thus energised to cause the camera to commence on a new cycle of operation, photographing a fresh section of material which has been advanced to the work position by the conveyor.

The cycle of events can be stopped by the operation of either the main control switch SW-1 or the auto-manual switch 64, either of which will open circuit A and prevent further energisation of the relay 60.

It will be understood that the perforations in the insulating belt are spaced by a distance which will be determined by the distance through which the conveyor is to advance between each cycle of operation of the camera. When this distance is to be varied, another insulating belt having perforations at an appropriate spacing can easily be substituted for an inappropriate belt by fitting it round the contact roller and the idler roller.

In order to permit manual control of the apparatus for single cycles of operation of the camera, the switch 64 is moved to the second of its positions, i.e. the "manual" position so that the bypass line A-1 is brought into use. Brief operation of the switch SW-2 then serves to complete the circuit via the camera start relay initiating a single complete cycle after which the switch SW-2 must again be operated briefly to start another single cycle or the apparatus can then be reset to perform a sequence of cycles by switching to the switch 64 to its auto position and operating switch SW-1 to start the sequence.

I claim:

1. Apparatus for feeding material to a work position comprising a conveyor, drive means for advancing the conveyor, and control means for coordinating the advance of the conveyor with the performance of a work operation on material carried by the conveyor, the control means comprising sensing means for sensing the advance of the conveyor, arresting means controlled by the sensing means for arresting the conveyor, initiating means controlled by the sensing means for initiating the performance of a work operation, and restarting means for causing the conveyor to advance after the completion of a work operation; said sensing means arranged to actuate the arresting means and the initiating means to arrest the conveyor and to initiate the performance of a work operation after the conveyor has advanced through a predetermined distance, said sensing means comprising an electrical circuit having a pair of normally closed contacts and means for opening the contacts at intervals dependent on the advance of the conveyor, said means for opening the contacts comprising a perforated belt of insulating material and means for advancing the belt between the contacts at a rate proportionate to the advance of the conveyor, said means for advancing the belt comprising a roller, the roller being driven by the drive means and constituting one of the contacts.

2. Apparatus according to claim 1 wherein the arresting means comprises a dog clutch, and the drive means comprises a motor and a torque clutch for taking up the drive of the motor when the conveyor is arrested.

3. Apparatus according to claim 2 including an electrical circuit under the control of the sensing means and the restarting means for operating the dog clutch.

4. Apparatus according to claim 1 wherein the initiating means comprises an initiating circuit including a starting relay for actuating the work means to perform a work operation, a pair of normally open contacts, a pair of normally closed contacts and a switch, and the arresting means comprises an arresting circuit including an electromagnet winding which when deenergised causes the arrest of the conveyor, and a pair of normally open contacts, a first relay, the normally open contacts of the arresting circuit and the normally closed contacts of the initiating circuit being operated to their abnormal condition by energisation of the first relay, a first circuit for operating the first relay comprising the winding of the first relay and a pair of normally open contacts which are closed momentarily at the end of a work operation, a second circuit for operating the first relay, the second circuit comprising a pair of normally closed contacts, the sensing means including a sensing circuit, the sensing circuit comprising a pair of normally closed contacts which are opened when the conveyor has advanced through the predetermined distance, and a second relay, the second relay being operative when energised to move the normally closed contacts of the second circuit and the normally open contacts of the initiating circuit to their abnormal condition.

5. Apparatus according to claim 1 including a camera responsive to the initiating means to photograph material advanced to a work position by the conveyor, the camera being arranged to actuate the restarting means after taking a photograph.

6. Apparatus for preparing micro-film photographs of record material comprising a conveyor, drive means for advancing the conveyor through a copying position, a micro-film camera arranged to photograph record material in the copying position and adapted to advance the film after taking a photograph, and control means for coordinating the advance of the conveyor with the operation of the camera, the control means comprising sensing means, arresting means controlled by the sensing means, initiating means controlled by the sensing means for actuating the camera to take a photograph and advance the film and restarting means actuated by the camera after a photograph has been taken for restarting the conveyor, wherein the sensing means comprises an electrical sensing circuit including a relay, an electrically conductive roller and a resilient contact normally engaging the roller, a perforated insulating belt arranged to be driven by the roller and to pass between the roller and the resilient contact, and the drive means includes a motor and a torque clutch and means for driving the roller, the arresting means includes a dog clutch operable to arrest advance of the conveyor and magnetic means for controlling the dog clutch.

7. Apparatus for feeding material to a work position comprising a conveyor, drive means for advancing the conveyor, and control means for coordinating the advance of the conveyor with the performance of a work operation on material carried by the conveyor, the control means comprising sensing means for sensing the advance of the conveyor, arresting means controlled by the sensing means for arresting the conveyor, initiating means controlled by the sensing means for initiating the performance of a work operation, and restarting means for causing the conveyor to advance after the completion of a work operation; wherein the sensing means is arranged to actuate the arresting means and the initiating means to arrest the conveyor and to initiate the performance of a work operation after the conveyor has advanced through a predetermined distance, and includes an electrical sensing circuit having a pair of normally closed contacts, a roller arranged to be driven at a rate proportional to the advance of the conveyor, and a perforated belt of insulating material arranged to be advanced between the contacts by the roller, said driving means including a motor and a torque clutch, the arresting means including the dog clutch which is operable to arrest the conveyor and cause the torque clutch to take up the drive of the motor.

8. Apparatus according to claim 7 including an electrical arresting circuit for magnetically operating the dog clutch.

9. Apparatus according to claim 8 including a first relay and a second relay, wherein the initiating means comprises and initiating circuit including a starting relay for actuating work means to perform a work operation, a pair of normally open contacts, a pair of normally closed contacts and a switch, and the arresting circuit includes a pair of contacts and an electromagnet winding, a first relay, the contacts of the arresting circuit and the normally closed contacts of the initiating circuit being operated to their abnormal condition by energisation of the first relay, a first circuit for operating the first relay, the first circuit including the winding of the first relay and a pair of normally open contacts which are closed momentarily at the end of a work operation, a second circuit for operating the first relay, the second circuit including a pair of normally closed contacts, the sensing circuit including a second relay, the second relay being operative when energised to move the normally closed contacts of the second circuit and the normally open contacts of the initiating circuit to their abnormal condition.

10. Apparatus as claimed in claim 9 including a camera responsive to the initiating means to photograph material advanced to a work position by the conveyor, the camera being arranged to acuate the restarting means after taking a photograph.

References Cited

UNITED STATES PATENTS 1,955,798   4/1934   Fassmann _____ 226—43
3,359,878   12/1967   Maciandi.

NORTON ANSHER, Primary Examiner

WAYNE A. SIVERTSON, Assistant Examiner

U.S. Cl. X.R.

271—57